United States Patent
Zeng

(10) Patent No.: US 8,812,226 B2
(45) Date of Patent: Aug. 19, 2014

(54) MULTIOBJECT FUSION MODULE FOR COLLISION PREPARATION SYSTEM

(75) Inventor: Shuqing Zeng, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1249 days.

(21) Appl. No.: 12/689,279

(22) Filed: Jan. 19, 2010

(65) Prior Publication Data

US 2010/0191391 A1 Jul. 29, 2010

Related U.S. Application Data

(60) Provisional application No. 61/147,175, filed on Jan. 26, 2009.

(51) Int. Cl.
*G08G 1/16* (2006.01)
(52) U.S. Cl.
USPC .......................................... 701/301; 382/103
(58) Field of Classification Search
USPC .................. 701/300–302; 340/435, 436, 903; 382/103, 104, 106, 107
See application file for complete search history.

(56) References Cited

U.S. PATENT DOCUMENTS

| | | | | |
|---|---|---|---|---|
| 5,554,983 A * | 9/1996 | Kitamura et al. | ............. | 340/937 |
| 5,739,848 A * | 4/1998 | Shimoura et al. | ............. | 348/119 |
| 6,246,961 B1 * | 6/2001 | Sasaki et al. | .................. | 701/301 |
| 6,704,621 B1 * | 3/2004 | Stein et al. | ......................... | 701/1 |
| 6,809,760 B1 * | 10/2004 | Takagi et al. | ............. | 348/211.9 |
| 7,113,867 B1 * | 9/2006 | Stein | .............................. | 701/301 |
| 7,460,951 B2 | 12/2008 | Altan et al. | | |
| 7,566,851 B2 * | 7/2009 | Stein et al. | ...................... | 250/205 |
| 7,613,321 B2 * | 11/2009 | Altherr et al. | ................. | 382/103 |
| 7,639,841 B2 * | 12/2009 | Zhu et al. | ....................... | 382/104 |
| 7,786,898 B2 * | 8/2010 | Stein et al. | ...................... | 340/937 |
| 7,860,162 B2 * | 12/2010 | Yokomitsu et al. | ...... | 375/240.12 |
| 8,064,643 B2 * | 11/2011 | Stein et al. | ...................... | 382/104 |
| 8,073,197 B2 * | 12/2011 | Xu et al. | ......................... | 382/103 |
| 8,081,794 B2 * | 12/2011 | Stiegler | ........................ | 382/100 |
| 8,170,280 B2 * | 5/2012 | Zhao et al. | ..................... | 382/103 |
| 8,224,029 B2 * | 7/2012 | Saptharishi et al. | .......... | 382/103 |
| 8,232,872 B2 * | 7/2012 | Zeng | .............................. | 340/436 |

(Continued)

FOREIGN PATENT DOCUMENTS

| | | |
|---|---|---|
| CN | 1654245 A | 8/2005 |
| CN | 101134463 A | 3/2008 |
| WO | 2004038260 A1 | 5/2004 |

OTHER PUBLICATIONS

U.S. Appl. No. 12/688,965, Shuqing Zeng, not publ.

*Primary Examiner* — Thomas Black
*Assistant Examiner* — Ce Li

(57) ABSTRACT

A method for controlling a vehicle operating during a dynamic vehicle event includes monitoring a first input image, monitoring a first tracked object within the first input image in a first tracking cycle, monitoring a second input image, monitoring a second tracked object within the second input image in a second tracking cycle, and determining a dissimilarity measure comparing the first tracked object to the second tracked object. The dissimilarity measure estimates whether the first tracked object and the second tracked object represent a single tracked object proximate to the vehicle. The method further includes associating the first tracked object and the second tracked object based upon the dissimilarity measure, and utilizing the associated objects in a collision preparation system to control operation of the vehicle.

10 Claims, 4 Drawing Sheets

(56) References Cited

U.S. PATENT DOCUMENTS

| | | | |
|---|---|---|---|
| 8,254,635 B2 * | 8/2012 | Stein et al. | 382/103 |
| 8,311,273 B2 * | 11/2012 | Ikeda | 382/103 |
| 8,379,915 B2 * | 2/2013 | Sharon et al. | 382/103 |
| 8,432,492 B2 * | 4/2013 | Deigmoeller et al. | 348/581 |
| 8,488,839 B2 * | 7/2013 | Sharon et al. | 382/103 |
| 2002/0087269 A1 * | 7/2002 | Sasaki et al. | 701/301 |
| 2004/0178945 A1 * | 9/2004 | Buchanan | 342/70 |
| 2005/0004761 A1 * | 1/2005 | Takahama et al. | 701/301 |
| 2005/0196017 A1 * | 9/2005 | Altherr et al. | 382/103 |
| 2006/0093185 A1 * | 5/2006 | Kato et al. | 382/103 |
| 2006/0153459 A1 * | 7/2006 | Zhang et al. | 382/224 |
| 2006/0171563 A1 * | 8/2006 | Takashima et al. | 382/104 |
| 2007/0154068 A1 * | 7/2007 | Stein et al. | 382/106 |
| 2007/0221822 A1 * | 9/2007 | Stein et al. | 250/205 |
| 2008/0049975 A1 * | 2/2008 | Stiegler | 382/104 |
| 2008/0118107 A1 * | 5/2008 | Sharon et al. | 382/103 |
| 2008/0166045 A1 * | 7/2008 | Xu et al. | 382/170 |
| 2009/0141940 A1 * | 6/2009 | Zhao et al. | 382/103 |
| 2009/0143986 A1 * | 6/2009 | Stein et al. | 701/301 |
| 2009/0244291 A1 * | 10/2009 | Saptharishi et al. | 348/187 |
| 2009/0245573 A1 * | 10/2009 | Saptharishi et al. | 382/103 |
| 2009/0315978 A1 * | 12/2009 | Wurmlin et al. | 348/43 |
| 2010/0080415 A1 * | 4/2010 | Qureshi et al. | 382/103 |
| 2010/0080417 A1 * | 4/2010 | Qureshi et al. | 382/103 |
| 2011/0096228 A1 * | 4/2011 | Deigmoeller et al. | 348/441 |

\* cited by examiner

MULTIOBJECT FUSION MODULE FOR COLLISION PREPARATION SYSTEM

CROSS REFERENCE TO RELATED APPLICATIONS

This application claims the benefit of U.S. Provisional Application No. 61/147,175 filed on Jan. 26, 2009, which is incorporated herein by reference.

TECHNICAL FIELD

This disclosure pertains generally to object-tracking systems, and more specifically to measurement systems associated with object-tracking systems related to vehicle operation.

BACKGROUND

The statements in this section merely provide background information related to the present disclosure and may not constitute prior art.

Modern vehicles may be equipped with various sensing devices and systems that assist a vehicle operator in managing vehicle operation and navigation. Known systems for ground vehicles can include autonomic control systems to control vehicle operation. For example, vehicles use cruise control systems to maintain a travel speed of the vehicle at an operator-selected speed. Further, vehicles use adaptive cruise control systems to control speed based on both the operator-selected speed and the presence of and distance to another vehicle in a projected travel path, for example, another vehicle in the current lane of the subject vehicle. Exemplary vehicle detection systems used by adaptive cruise control systems include radar detection devices and LIDAR detection devices to detect the position and speed of other vehicles within the projected travel path of the subject vehicle.

Known vehicle systems include autonomic and semi-autonomous vehicle control systems that include maneuvering capabilities. Known autonomic vehicle control systems include travel path and speed control capabilities. An exemplary autonomic control system having maneuvering capability is an autonomic lane-change system. Known autonomic lane-change systems include on-vehicle monitoring systems configured to detect object vehicles in a current lane of the subject vehicle and object vehicles in lanes adjacent to and in proximity to the subject vehicle. Known vehicle detection systems include camera-based systems, radar detection devices and LIDAR detection devices to identify relative locations and trajectories of vehicles and other objects. The autonomic lane-change system includes a human-machine interface device to receive commands from the vehicle operator and actuators to automatically steer the subject vehicle to change vehicle trajectory in response to the commands. Operation of the autonomic lane-change system includes a vehicle operator commanding activation of the autonomic lane-change system through the human-machine interface device, thereby indicating a desire to change the driving lane of the subject vehicle. When the autonomic lane-change system is activated, the autonomic lane-change system monitors adjacent travel lanes and operates the steering system of the subject vehicle to maneuver the subject vehicle into the adjacent lane.

Vehicles also include a number of safety systems designed to lessen the effects of a collision. Accurately predicting an imminent collision event is desirable in preparation for a collision event.

SUMMARY

A method for controlling a vehicle operating during a dynamic vehicle event includes monitoring a first input image, monitoring a first tracked object within the first input image in a first tracking cycle, monitoring a second input image, monitoring a second tracked object within the second input image in a second tracking cycle, and determining a dissimilarity measure comparing the first tracked object to the second tracked object. The dissimilarity measure estimates whether the first tracked object and the second tracked object represent a single tracked object proximate to the vehicle. The method further includes associating the first tracked object and the second tracked object based upon the dissimilarity measure, and utilizing the associated objects in a collision preparation system to control operation of the vehicle.

BRIEF DESCRIPTION OF THE DRAWINGS

One or more embodiments will now be described, by way of example, with reference to the accompanying drawings, in which.

DETAILED DESCRIPTION

Figure 1:
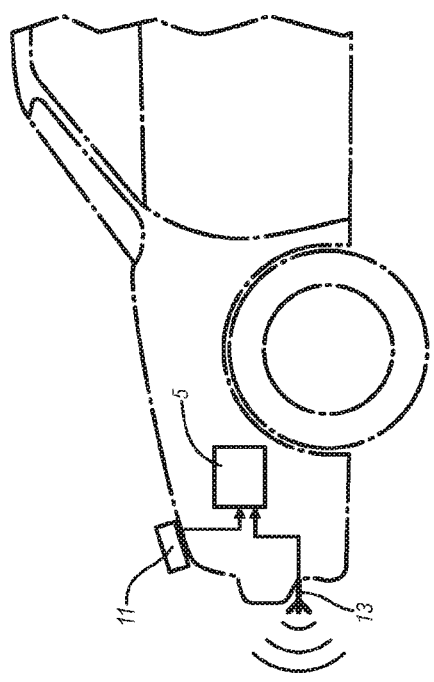
FIG. 1 schematically depicts an exemplary arrangement of a vehicle equipped with a camera and a radar imaging system, in accordance with the present disclosure.

Referring now to the drawings, wherein the showings are for the purpose of illustrating certain exemplary embodiments only and not for the purpose of limiting the same, FIG. 1 illustrates an exemplary arrangement of camera 11 located on the front of a vehicle 10 and pointed toward the ground in front of the vehicle 10 in accordance with the disclosure. Camera 11 is in communication with control module 5 containing logic to process inputs from camera 11. The vehicle 10 may also be equipped with a radar imaging system 13, which, when present, is also in communication with control module 5. It should be appreciated by those having ordinary skill in the art that the vehicle 10 could utilize a number of methods to identify road conditions in addition or in the alternative to the use of camera 11 and the radar imaging system 13, including GPS information, information from other vehicles in communication with the vehicle 10, historical data concerning the particular roadway, biometric information such as systems reading the visual focus of the driver, a radar imaging system, or other similar systems. The disclosure herein can be applied to various device arrangements and is therefore not limited thereby.

The camera 11 is a device well known in the art capable of translating visual inputs in the form of light, infrared, or other electro-magnetic (EM) radiation into a data format readily capable of analysis, e.g., a digital, pixelated image. In one embodiment, the camera 11 uses a charge coupled device (CCD) sensor to generate images indicating a field-of-view. Preferably, the camera 11 is configured for continuous image generation, e.g., 30 images generated per second. Images generated by the camera 11 may be stored in memory within the camera 11 or transferred to the control module 5 for storage and/or analysis. Preferably, each image generated by the camera 11 is a two-dimensional image of known pixel dimensions comprising a plurality of identifiable pixels. The plurality of identifiable pixels may be stored and analyzed using an array. Each pixel may be represented in the array as a set of bits or a plurality of sets of bits wherein the bits correspond to a color on a predetermined palette or color map. Each pixel may be expressed as a function of a plurality of color intensity values such as in a red-green-blue (RGB) color model or a cyan-magenta-yellow-key (CMYK) color model. Preferably, each pixel comprises a plurality of sets of bits wherein each set of bits corresponds to a color intensity and a color intensity value e.g., a first set of bits corresponds to a red color intensity value, a second set of bits corresponds to a green color intensity value, and a third set of bits corresponds to blue color intensity value on the RGB color model.

The radar imaging device 13 is a device well known in the art incorporating a transmitter capable of emitting radio waves or other EM radiation, a receiver device capable of sensing the emitted waves reflected back to the receiver from objects in front of the transmitter, and means to transfer the sensed waves into a data format capable of analysis, indicating for example range and angle from the objects off which the waves reflected. Alternatively, the radar imaging device 13 may be replaced or supplemented with a light detection and ranging (LIDAR) system configured to transmit and receive optical energy. The received optical energy may be used to determine object geometric dimensions and/or geometrical proximity to the vehicle 10. It will be noted that radar imaging device 13 is optional and unnecessary to perform many of the methods disclosed herein, wherein processing of visual images is capable of accomplishing clear path detection. The term "clear path" as used herein is to be given its ordinary and customary meaning to a person of ordinary skill in the art (and it is not to be limited to a special or customized meaning), and refers without limitation to a path free of objects exceeding a threshold, e.g., a path free of objects classified in the abovementioned second and third categories.

The control module 5 is illustrated in FIG. 1, and described herein as a discrete element. Such illustration is for ease of description and it should be recognized that the control module 5 may take any suitable form including various combinations of one or more Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. The control module has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

The control module 5 executes algorithmic code stored therein to monitor related equipment such as camera 11 and radar imaging system 13 and execute commands or data transfers as indicated by analysis performed within the processing module. Control module 5 may include algorithms and mechanisms to actuate autonomous driving control by means known in the art and not described herein, or control module 5 may simply provide information to a separate autonomous driving system. Control module 5 is adapted to receive input signals from other systems and the operator as necessary depending upon the exact embodiment utilized in conjunction with the control module.

Figure 2:
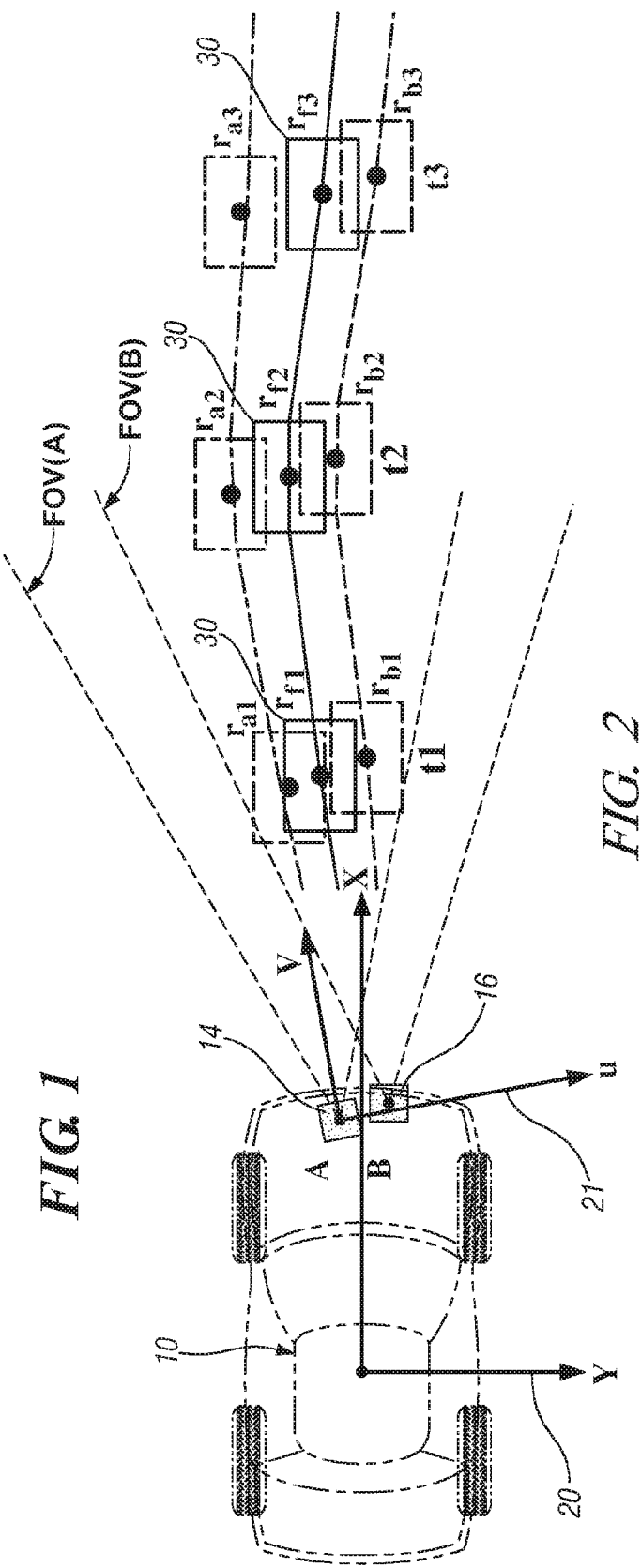
FIG. 2 schematically depicts an exemplary vehicle utilizing sensors to create a fused track of an object, in accordance with the present disclosure.

FIG. 2 schematically depicts the exemplary vehicle 10 utilizing sensors to create a fused track of an object, in accordance with the present disclosure. The exemplary vehicle comprises a passenger vehicle intended for use on highways, although it is understood that the disclosure described herein is applicable on any vehicle or other system seeking to monitor position and trajectory of remote vehicles and other objects. The vehicle includes a control system containing various algorithms and calibrations executed at various times. The control system is preferably a subset of an overall vehicle control architecture and provides coordinated vehicle system control. The control system monitors inputs from various sensors, synthesize pertinent information and inputs, and execute algorithms to control various actuators to achieve control targets, including such parameters as collision avoidance and adaptive cruise control. The vehicle control architecture comprises a plurality of distributed processors and devices, including a system controller providing functionality such as antilock braking, traction control, and vehicle stability.

The exemplary sensing system preferably includes object-locating sensors comprising at least two forward-looking range sensing devices 14 and 16 and accompanying subsystems or processors. The object-locating sensors may include the radar imaging device 13 as described herein above configured to include a short-range radar subsystem, a long-range radar subsystem, and a forward vision system. The object-locating sensing devices may include any range sensors, such as described herein above including FM-CW radars, (Frequency Modulated Continuous Wave), pulse and FSK (Frequency Shift Keying) radars, and LIDAR devices, and ultrasonic devices which rely upon effects such as Doppler-effect measurements to locate forward objects. The possible object-locating devices include the camera 11 as described herein above which utilizes digital photographic methods to 'view' forward objects. Such sensing systems are employed for detecting and locating objects in automotive applications, useable with systems including, e.g., adaptive cruise control, collision avoidance, pre-crash safety, and side-object detection. The exemplary vehicle system may also include a global position sensing (GPS) system.

These sensors are preferably positioned within the vehicle 10 in relatively unobstructed positions relative to a view in front of the vehicle. It is also appreciated that each of these sensors provides an estimate of actual location or condition of a targeted object, wherein said estimate includes an estimated position and standard deviation. As such, sensory detection and measurement of object locations and conditions are typically referred to as "estimates." It is further appreciated that the characteristics of these sensors are complementary, in that some are more reliable in estimating certain parameters than others. Conventional sensors have different operating ranges and angular coverages, and are capable of estimating different parameters within their operating range. For example, radar sensors can usually estimate range, range rate and azimuth location of an object, but are not normally robust in estimating the extent of a detected object. A camera with vision processor is more robust in estimating a shape and azimuth position of the object, but is less efficient at estimating the range and range rate of the object. Scanning type LIDARs perform efficiently and accurately with respect to estimating range, and azimuth position, but typically cannot estimate range rate, and are therefore not accurate with respect to new object acquisition/recognition. Ultrasonic sensors are capable of estimating range but are generally incapable of estimating or computing range rate and azimuth position. Further, it is appreciated that the performance of each sensor technology is affected by differing environmental conditions. Thus, conventional sensors present parametric variances whose operative overlap of these sensors creates opportunities for sensory fusion.

Each object-locating sensor and subsystem provides an output including range, R, time-based change in range, R_dot, and angle, Θ, preferably with respect to a longitudinal axis of the vehicle, which can be written as a measurement vector (o), i.e., sensor data. An exemplary short-range radar subsystem has a field-of-view (FOV) of 160 degrees and a maximum range of thirty meters. An exemplary long-range radar subsystem has a field-of-view of 17 degrees and a maximum range of 220 meters. An exemplary forward vision subsystem has a field-of-view of 45 degrees and a maximum range of fifty (50) meters. For each subsystem the field-of-view is preferably oriented around the longitudinal axis of the vehicle 10. The vehicle is preferably oriented to a coordinate system, referred to as an XY-coordinate system 20, wherein the longitudinal axis of the vehicle 10 establishes the X-axis, with a locus at a point convenient to the vehicle and to signal processing, and the Y-axis is established by an axis orthogonal to the longitudinal axis of the vehicle 10 and in a horizontal plane, which is thus parallel to ground surface.

U.S. Pat. No. 7,460,951, entitled SYSTEM AND METHOD OF TARGET TRACKING USING SENSOR FUSION, is hereby incorporated by reference such that the method and apparatus for fusing tracking data from a plurality of sensors to more accurately estimate a location of an object need not be fully described in detail herein.

Returning to FIG. 2, vehicle 10 is depicted including a pair of sensing systems 14 and 16. Vehicle 10 can be referenced to a coordinate system (X,Y) 20, wherein coordinates are defined with reference to a longitudinal axis of the vehicle and a lateral position, for example, as compared to a centerline of the vehicle. Sensing systems 14 and 16 can be any of the exemplary systems described above or systems known in the art capable of returning a track of a sensed object. Sensors can have their own coordinate system. Exemplary coordinate system (u,V) 21 is depicted referencing sensor system 14. An object 30 is depicted at three different times. Sensor system 14, sensing objects within FOV(A), returns three tracked object locations for object 30, labeled $r_{a1}$, $r_{a2}$, and $r_{a3}$. Sensor system 16, sensing objects within FOV(B), similarly returns three tracked object locations for object 30, labeled $r_{b1}$, $r_{b2}$, and $r_{b3}$. Fused positions for object 30 can be described based upon the available information regarding object 30. Methods to fuse multiple sets of data into a fused set are known in the art. Exemplary methods can, for instance, apply weights or measured variances in the various data points, and the contribution of each individual point to the fused set can depend upon the weights or variances. FIG. 2 depicts an exemplary set of fused data points labeled $r_{f1}$, $r_{f2}$, and $r_{f3}$.

Figure 3:
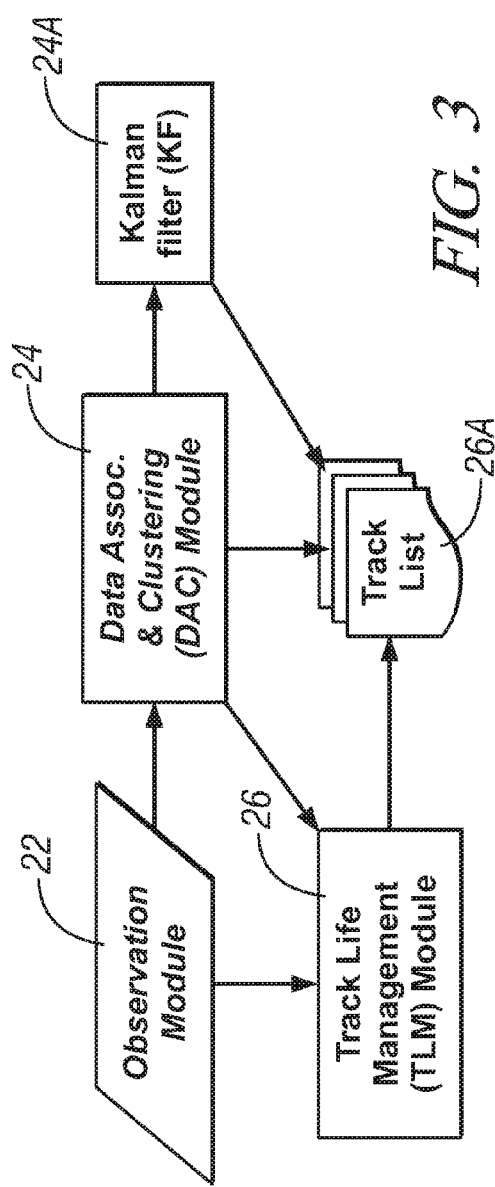
FIG. 3 schematically depicts an exemplary process to monitor sensor inputs and create a track list, in accordance with the present disclosure.

FIG. 3 schematically depicts an exemplary process to monitor sensor inputs and create a track list corresponding to detected objects, in accordance with the present disclosure. Exemplary vehicle 10 generally includes a control system having an observation module 22, a data association and clustering (DAC) module 24 that further includes a Kalman filter 24A, and a track life management (TLM) module 26 that keeps track of a track list 26A comprising of a plurality of object tracks. More particularly, the observation module includes sensors 14 and 16, their respective sensor processors, and the interconnection between the sensors, sensor processors, and the DAC module 24.

The above exemplary object tracking system illustrates one method by which an object or multiple objects may be tracked. However, one will appreciate that a number of different sensors gathering information regarding the environment around the vehicle might be utilized similarly, and the disclosure is not intended to be limited to the particular embodiments described herein. Additionally, the data fusion method described herein above is one exemplary method by which the details of the various input sensors might be fused into a single useful track of an object. However, numerous data fusion methods are known in the art, and the disclosure is not intended to be limited to the particular exemplary embodiment described herein.

Methods are herein disclosed for controlling vehicle operating using a collision preparation system and motion of identified objects. The identified object is analyzed in order to identify a likely impending or imminent collision based upon the object motion relative to the vehicle. The collision preparation system is configured to alert a vehicle operator of an impending collision and configured to control vehicle operation by e.g., by automatic braking if the collision is considered to be unavoidable to reduce collision severity.

Vision systems provide an alternate source of sensor input for use in vehicle control systems. Methods for analyzing visual information are known in the art to include pattern recognition, corner detection, vertical edge detection, vertical object recognition, and other methods. However, it will be appreciated that high-resolution visual representations of the field in proximity a vehicle refreshing at a high rate necessary to appreciate motion in real-time include a very large amount of information to be analyzed. Real-time analysis of visual information can be prohibitive. A method is disclosed to fuse input from a vision system with a fused track created by methods such as the exemplary track fusion method described above to focus vision analysis upon a portion of the visual information most likely to pose a collision threat and utilized the focused analysis to alert to a likely imminent collision event. Further, a method is described employing iterative tracking cycles to identify a tracked object, for example, using information determined in one cycle to assist determination of information in the next cycle. Further, a method is described to apply a bank of filters to an tracked object in an image and determine through application of a model which filter output is the best estimation of the tracked object.

Figure 4:
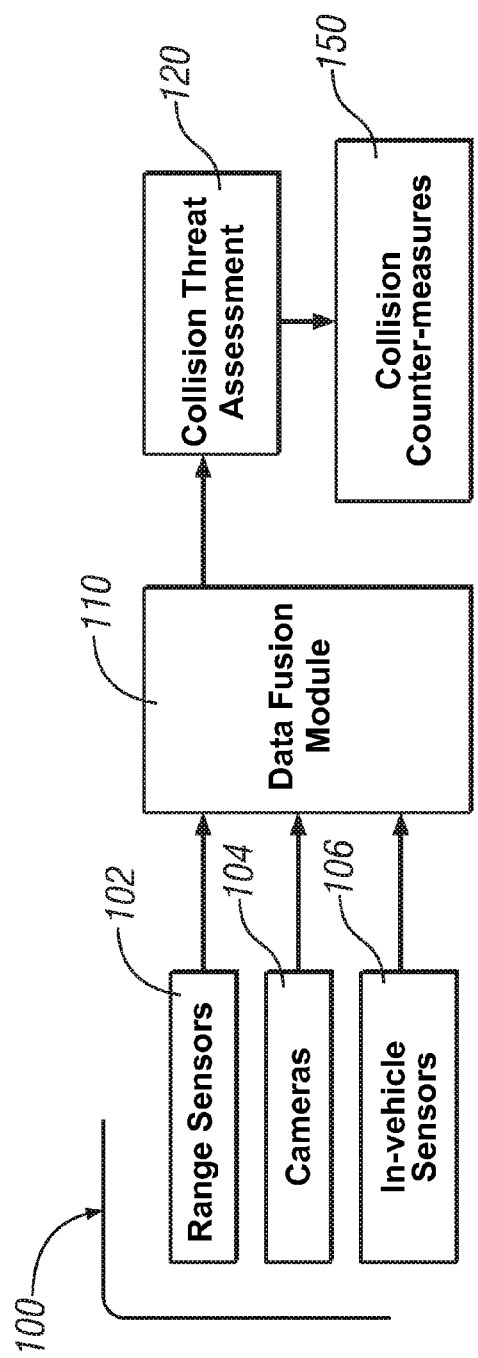
FIG. 4 schematically illustrates an exemplary system whereby sensor inputs are fused into object tracks useful in a collision preparation system, in accordance with the present disclosure.

FIG. 4 schematically illustrates an exemplary control scheme 100 for a collision preparation system in accordance with the present disclosure. The control scheme is illustrated in FIG. 4, and described herein as comprising discrete elements. Such illustration is for ease of description and it should be recognized that the functions performed by these elements may be combined in one or more devices, e.g., implemented in software, hardware, and/or application-specific integrated circuitry. For example, the control scheme 100 may be implemented in the control module 5. The control scheme 100 includes monitoring sensor input data describing an environment around the vehicle 10 including range sensors 102, camera images 104, and in-vehicle sensors 106. Preferably, the control scheme 100 continuously monitors the surround vehicle environment using its range sensors (e.g., radars and LIDARs) and cameras.

A data fusion module 110 inputs the sensor data. The data fusion module 110 analyzes, filters, or prioritizes the inputs relative to the reliability of the various inputs, and the prioritized or weighted inputs are summed to create track estimates for objects in proximity to the vehicle 10. These object tracks are then input to the collision threat assessment module 120, wherein each track is assessed for a likelihood for collision. It will be appreciated that a collision need not occur for the methods herein to be employed, but rather based upon an evaluation of a dynamic vehicle event (for example, a changing relationship of a detected object to the host vehicle suggesting imminent collision), a likelihood of collision can be evaluated. This likelihood for collision can be evaluated, for example, against a threshold likelihood for collision, and if a collision is determined to be likely, collision counter-measures can be initiated. The likelihood for collision of an identified object is analyzed by a collision counter-measures module 150.

Collision counter-measures can take many forms known in the art. For example, vehicle braking systems can be automatically activated in an attempt to slow the vehicle before an impact. Similarly, throttle to the engine can be cut in order to reduce the speed of the vehicle and the kinetic energy of the vehicle before the impact. Automated steering can be activated, for example, to square up the vehicle before the collision to avoid the effects of an angular impact. Similarly, if a side-impact is projected to be imminent, steering and forward motion of the vehicle can be controlled to adjust impact away from the passenger compartment of the vehicle. Similarly, if a rear-impact is projected to be imminent, the throttle of the vehicle can be increased to reduce the difference in speeds of the vehicles at the time of impact. Other vehicle systems can additionally be controlled in preparation for an impact. For example, seat belts of the occupants can be tightened and/or locked in preparation for the impact. Headrests of the vehicle can be manipulated in order to best protect the head and neck of the occupants of the vehicle. Air bags can be preemptively deployed an instant before the projected impact, for example, with a decreased pressure, thereby decreasing a likelihood of the passenger being affected by the usual rapid deployment of the airbags. Windows can be automatically closed and doors can be locked before the impact. Foot pedals can be adjusted into a retracted position in order to reduce a likelihood of interacting with the vehicle operator during the impact. An initial emergency signal can be transmitted by a wireless communication network in order to alert emergency personnel, avoiding an inability for the system to communicate if the impact damages the operation of the system. An audible imminent collision alert can be sounded to alert the occupants of the vehicle. A number of collision counter-measures are envisioned, and the disclosure is not intended to be limited to the particular exemplary embodiments described herein.

In one embodiment the exemplary control scheme 100 described herein above is used to control a vehicle operating during a dynamic vehicle event. The method includes monitoring range sensor information and vision system information. Superimposing the range sensor information upon the vision system information generates a modified image. Salient image areas are identified within the modified image using edge detection, corner detection, and optical flow detection, wherein the salient image areas corresponding to ground are excluded. The method further includes identifying a first object in a vehicle field-of-view using the salient image areas in a first time step and identifying a second object in the vehicle field-of-view using the salient image areas in a subsequent time step. A position of the first object in the subsequent time step is predicted and matched to the second object based upon comparing the predicted position of the first object and the identified second object. An object track of the matched objects is determined and a likelihood for collision between the matched object and the vehicle based upon the object track is determined. The vehicle is controlled based upon the likelihood for collision.

Figure 5:
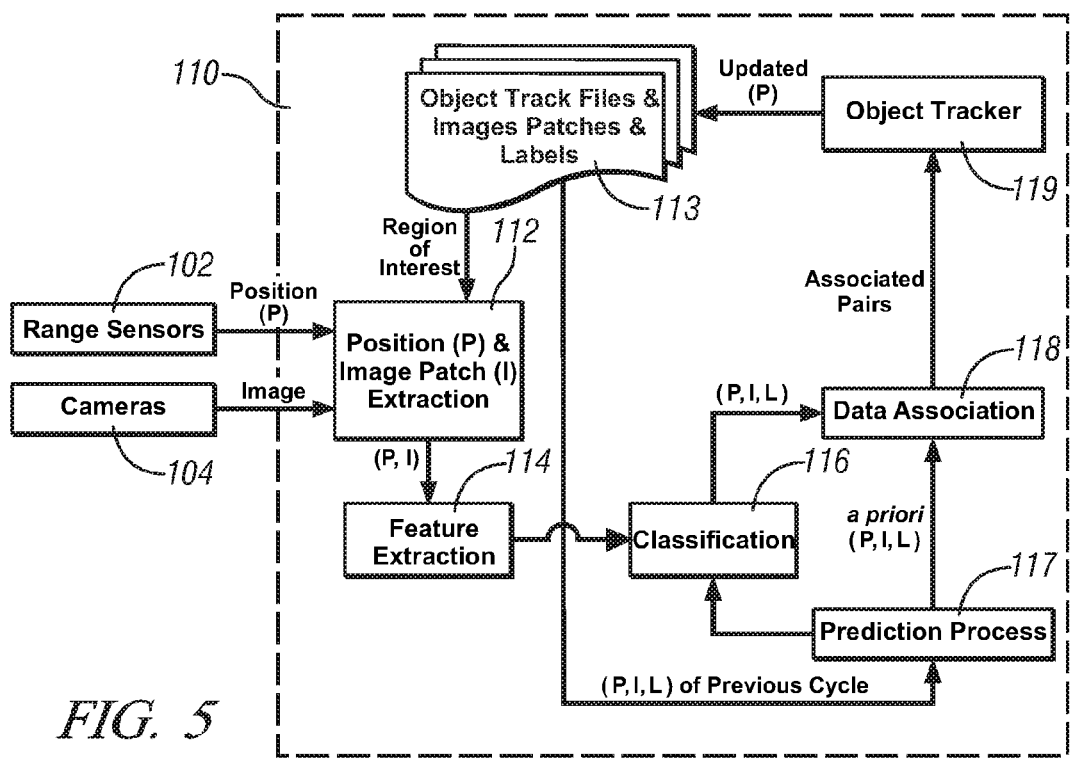
FIG. 5 schematically illustrates an exemplary fusion module, in accordance with the present disclosure.

FIG. 5 schematically illustrates the exemplary image fusion module 120, in accordance with the present disclosure. The fusion module 110 integrates input from various sensing devices including cameras 104 and range sensors 102 and generates a fused track of an object in proximity to the vehicle 10. The range sensor data includes position data of a list of objects in a vehicle two-dimensional coordinate system. In one exemplary embodiment, the objects are projected or superimposed upon the camera data to generate a modified image in a motion analysis and salient region detection module 112, preferably using predetermined camera calibration parameters adjusted to correspond to the vehicle two-dimensional coordinate system. Range information such as radar returns matched with corresponding regions of the image can be used to identify locations of potential objects in the image. Additional lighting normalization may be applied to the camera data and modified image. Normalization is a process which changes the range of pixel intensity values. The purpose of the normalization is to bring the image into a range that is more suitable for machine process to improve the reliability. For example, each pixel value is normalized to be a zero mean and unit variance to enhance the image contrast, specifically in a low lighting environment or when contrast is poor due to glare.

The motion analysis and salient region detection module 112 identifies image areas for further analysis that exhibit a threshold confidence for containing objects or parts of objects. Image areas corresponding to previously identified objects are determined using a priori information including object information of previous time-step such as the object track and position. In one embodiment, the objects are projected on the modified image using object position, elapsed time between iterations, and an associated object track. The salient image areas can be identified using extraction algorithms including a scale-invariant feature transform (SIFT), a speeded up robust feature (SURF) algorithm, and/or a maximally stable extreme region (MSER) algorithm. A histogram of oriented gradients (HOG) and eigen-image coefficients can be used in one embodiment.

Other regions of interest in the modified image may be identified using edge, corner, and salient blob detection methods. Additional regions of interest may be identified using optical flow detection between consecutive modified images and by projecting previously identified objects onto the modified image as described herein below. Edge detection may be executed using one of multiple known methods. Corners may be identified using one of multiple algorithms including a Harris corner detection algorithm.

For salient blobs identification on the modified image described above, a Gaussian operator is applied on the modified image. In operation, a modified image I(x, y), wherein x and y are row and column indices of the image, is convolved by a Gaussian kernel such as the following.

$$g(x, y, t) = \frac{1}{2\pi t} e^{-\frac{x^2+y^2}{2t}} \quad [1]$$

The modified image is convolved by the Gaussian kernel at a certain scale t to give a scale-space representation such as the following relationship.

$$L(x,y,t) = g(x,y,t) * f(x,y) \quad [2]$$

After convolving the modified image, a scale-normalized Difference of Gaussian operator is determined based upon the scale-space representation. The scale-normalized Difference of Gaussian (DoG) operator may be determined using the following relationship.

$$DoG\{I(x, y); t\} = \frac{1}{2\Delta t}(L(x, y; t + \Delta t) - L(x, y; t - \Delta t)) \quad [3]$$

The salient blobs are located by highlighting points on the modified image having simultaneous correspondence to a local maxima/minima of the Difference of Gaussian operator with respect to both space and scale. The local maxima/minima of the Difference of Gaussian operator may be determined using the following relationship.

$$(\hat{x},\hat{y},\hat{t}) = \mathrm{argmaxmin}_{(x,y,t)}(DoG\{I(x,y),t\}) \quad [4]$$

One of multiple optical flow detection methods may be used to identify image areas exhibiting motion between consecutive modified images. One method includes analyzing consecutive modified images $I_{t-1}(x,y)$ and $I_t(x,y)$ using a Lucas-Kanade optical flow operator to determine regions of interest corresponding to motion. Additionally, thresholding and a 4-neighborhood connected component tracking may be applied to the optical flow image to identify regions indicating significant motion. Applying Lucas-Kanade optical flow operator between consecutive modified images yields an optical flow map that includes pixels associated with movement between modified images in one embodiment.

Areas of interest in the modified image may additionally be identified by analyzing pixels for visual characteristics such as color and/or texture corresponding to a ground in the area neighboring the vehicle 10. Pixel areas corresponding to ground are unlikely to contain objects and may be properly disregarded. Additionally, image areas exhibiting a threshold quantity of ground corresponding pixels may be disregarded in one embodiment. Further, disassociation with objects identified by the range sensor data yields information regarding pixel correspondence to the ground. The pixel classifications of pixels within segmented image areas or patches of the modified image are analyzed. Image areas containing a predetermined number of pixels associated with a ground classification are less likely to contain an object.

After analyzing the modified image for salient regions and image areas associated with motion and features, the motion analysis and salient region detection module 112 identifies image areas associated with a confidence level greater than a predetermined threshold correspondence to an object and outputs the identified image areas. In one embodiment, weights indicating a confidence correspondence to object presence are associated with particular identified features and quantitatively applied based upon feature propensity in the image area. Similarly, weights may be applied to salient regions, image areas associated with motion, and image areas containing prior identified objects. Weights associated with the image areas may be summed wherein image areas corresponding to a threshold weight are outputted from the motion analysis and salient region detection module 112. In one embodiment, each extracted feature, image areas associated with motion, objects identified in a prior time-step, and image areas not classified as ground are fused together. Image areas associated with a threshold of fused pixels are outputted from the motion analysis and salient region detection module 112.

Figure 6:
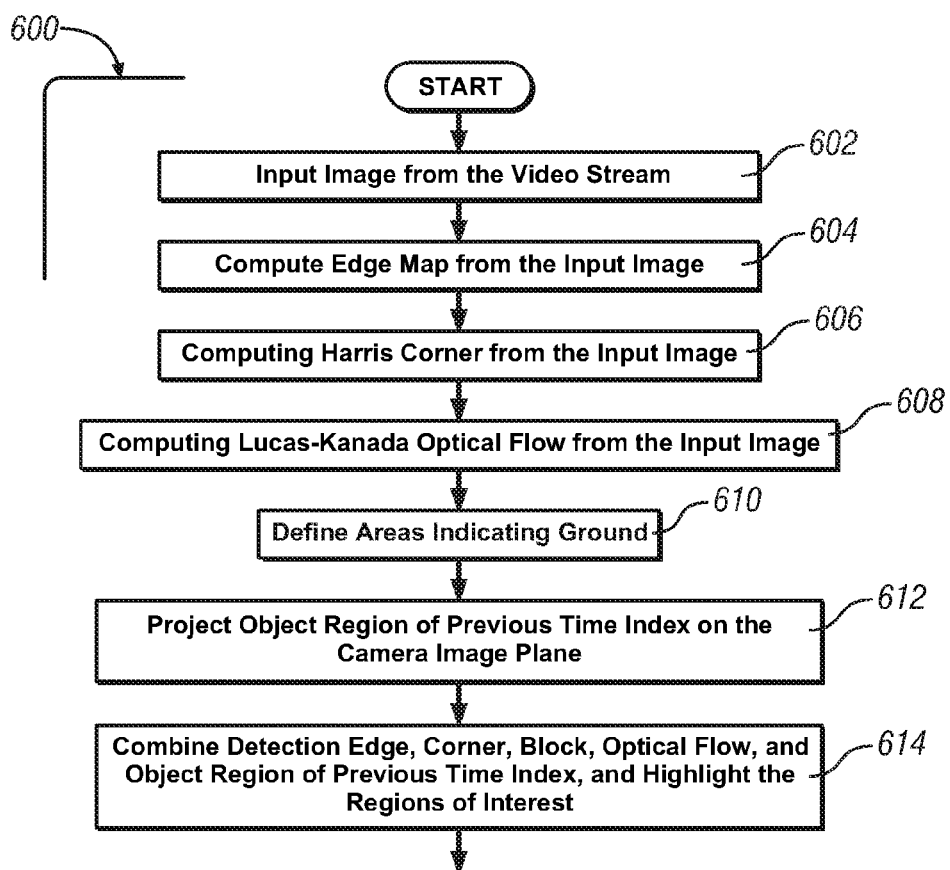
FIG. 6 illustrates an exemplary control scheme for identifying salient image areas and image areas associated with motion, in accordance with the present disclosure.

FIG. 6 illustrates an exemplary control scheme 600 for identifying salient image areas and image areas associated with motion using methods described herein above, in accordance with the present disclosure. The control scheme 600 is illustrated in FIG. 6, and described herein as comprising discrete elements. Such illustration is for ease of description and it should be recognized that the functions performed by these elements may be combined in one or more devices, e.g., implemented in software, hardware, and/or application-specific integrated circuitry. In one embodiment, the control scheme 600 is implemented in the motion analysis and salient region detection module 112.

The control scheme 600 continuously inputs and monitors modified images 602 created using the camera data and range sensor data described herein above. Utilizing methods known in the art or described herein, the control scheme 600 determines an edge map 604, a corner map using the Harris Corner Detection algorithm 606, and a Lucas-Kanade optical flow map 608. It will be appreciated that steps 604 through 608 identify patterns in the image that are likely to include objects distinguishable from the ground or a road surface upon which the vehicle can drive. Through methods known in the art, including analysis of pixel properties and analysis of regions of the image describing factors such as a color and line patterns, regions of the image likely to include the ground can be identified. By comparing this region or regions to the identified regions with patterns descriptive of objects, a determination can be made to define areas or regions of the image likely to include ground and not indicate objects to be tracked. Process 600 defines areas indicating ground 610 based upon the inputted modified image as described herein above. Objects identified in a prior iteration are projected on the modified image as described herein above 612. The edge map, corner map, Lucas-Kanade optical flow map, image areas not corresponding to ground, and projected objects are fused together to identify image areas on the modified image corresponding to an object 614.

Returning to FIG. 5, after identifying image areas on the modified image, the motion analysis and salient region detection module 112 output object position (P) and the identified image areas, including a defined area of features (I), to a feature extraction module 114 for further analysis. The feature extraction module 114 analyzes the image area by applying known feature identification algorithms to the patch. Feature identification algorithms search available visual information for characteristic patterns in the image area associated with an object including features defined by line orientation, line location, color, corner characteristics, other visual attributes, and learned attributes. In one embodiment, feature identification algorithms may be applied to sequential images to identify changes corresponding to vehicle motion, wherein changes not associated with ground movement may be identified not clear path. The feature extraction module 114 monitors the images areas of the modified image and determines a feature descriptor for each image area. The feature descriptor may be determined using feature extraction algorithms and transforms such as histogram of predetermined distinguishing features such as vertical edges, symmetry, histogram of gradient orientation (HOG), and using projection onto a linear subspace, e.g., principle component analysis. Additional distinguishing features may be defined by methods known in the art, such as Haar wavelet, Gabor wavelet, and Leung-and-Malik filter bank.

The classification module 116 analyzes each image area and assigns a label (L) to each identified object and associated image areas based upon a pre-trained classifier. The classification module 116 takes the extracted features and prior identified objects (a priori) and associated data including position, image area, and classification label are updated for the current time-step in a prediction process module 117 as input and feeds to a classifier to determine whether an image area encloses an object. The classification determines the label of each identified object according to any number of classifiers. An exemplary classifications include e.g., a quickly moving object, such a vehicle in motion, a slowly moving object, such as a pedestrian, and a stationary object, such as a street sign. The classification module 116 utilizes statistical classifier methods, including training classifiers for correspondence to features or attributes in the image area using significant number of object and non-object image samples. Learned attribute correspondence to features in the image area may be learned by machine learning algorithms within the vehicle, but are most frequently programmed offline and may be developed experimentally, empirically, predictively, through modeling or other techniques adequate to accurately train distinguishing attributes. These attributes allow the control scheme to develop a confidence between zero and one that the features identified within the image area correspond to a predetermined classified object. A threshold confidence can be set, defining the confidence required to identify a particular image area as indicating an object.

One of multiple methods may be used to apply trained classifiers to the features extracted from the image areas. A first method analyzes the features using a training set of images. Information from the trained classifiers is used to classify or weight the feature as indicating a particular object, the particular classification depending upon the strength of comparisons to the trained data. Classification of the feature, if the feature is the only feature within the image area, may be directly applied to the image area. Classification of an image area with multiple features identified may take many forms, including the image area being defined by the included feature most indicative of the image area corresponding to a particular object or the image area being defined by a weighted sum of all of the features included therein.

Additional method used to apply trained classifiers to the features extracted from the image areas to identify and classify object in the image areas include utilizing a support vector machine (SVM) and a neural network. As one skilled in the art will recognize, artificial neural networks or neural networks are computer systems created for complex and adaptable decision making. Whereas traditional computing means are based upon sequential processing of data through an algorithm yielding predictable results, neural networks are known to process data in consecutive layers and parallel paths within each layer through alternate nodes. The neural network is initially trained with data yielding a known set of results. As a result of this training, weights are applied between the layers and among the nodes, the network automatically adapting to the training data and adjusting the weights to more closely model the data. In later use, the neural network can retain the training adjustments and apply them through the life of the network, or the network can employ various known methods to learn from ongoing data patterns. By training and tuning a neural network, input data including multiple identified features can be analyzed to identify and classify objects in the image areas.

After determining the label in the classification module 116, an object within an input image can be described according to P, I, and L, according to methods described above. A data association module 118 analyzes the current object list including P, I, and L with the prior objects (a priori) and associated data including position, image area features, and classification label are updated for the current time-step in the prediction process module 117 using an object dynamic model. The data association module 118 matches the current identified objects with prior identified objects and outputs a list of matched object-measurement pairs. The prior identified objects are updated to the current time-step using the prediction process module 117 as described herein below.

By comparing an object (P, I, and L) in a second tracking cycle analyzing a second input image to another object (P, I, and L) in a first tracking cycle analyzing a first input image, a determination can be made whether the two objects likely refer to the same tracked object in the proximity of the vehicle. In one exemplary method, the current object list can be matched to the predicted object list using a dissimilarity measure between object P, I, and L descriptors. The dissimilarity $D(\hat{o}_\beta, x_\alpha)$ between the two objects $\alpha$ and $\beta$ is defined as follows:

$$D(\hat{o}_\beta, x_\alpha) = w_P d(\hat{P}_\beta, P_\alpha) + w_I d(\hat{I}_\beta, I_\alpha) + w_L d(\hat{L}_\beta, L_\alpha) \qquad [5]$$

where $d(\hat{P}_\beta, P_\alpha)$ is the position distance between the objects $\alpha$ and $\beta$ being compared, $d(\hat{I}_\beta, I_\alpha)$ is the dissimilarity between the two objects and calculated as a distance between two corresponding feature descriptor vectors, and $$d(\hat{L}_\beta, L_\alpha) = \begin{cases} 1, & \text{iff } \hat{L}_\beta = L_\alpha \\ 0, & \text{otherwise,} \end{cases}$$

describing a binary factor comparing labels of the two objects. $w_P$, $w_I$, and $w_L$, are weights experimentally determined and calibrated. By comparing position of the tracked objects, image features proximate to the tracked objects, and labels of the tracked objects, an estimation whether the two objects represent the same tracked object proximate to the vehicle can be made.

In operation, an α-th predicted object from the predicted object list (a priori) is denoted as $x_\alpha = (I_\alpha, P_\alpha, L_\alpha)$ where $I_\alpha$ is a feature descriptor of the corresponding image patch, $P_\alpha$ is the position of the object, and $L_\alpha$ is the classification label (e.g., vehicle, pedestrian, motor cycle, bicycle, deer). A β-th detected current object is denoted as $\hat{o}_\beta = (\hat{I}_\beta, \hat{P}_\beta, \hat{L}_\beta)$. If the dissimilarity $D(\hat{o}_\beta, x_\alpha)$ is less than a threshold, then the observed object $\hat{o}_\beta$ is associated with the predicted object $x_\alpha$.

Figure 7:
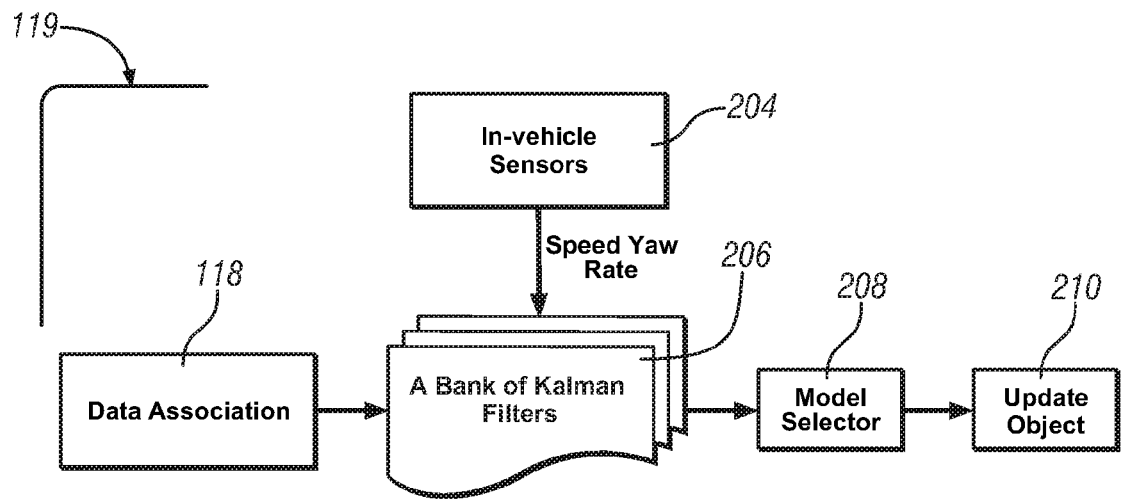
FIG. 7 schematically depicts an exemplary bank of Kalman filters operating to estimate position and velocity of a group objects, in accordance with the present disclosure.

An object tracker module 119 monitors the output of the data association module 118 to determine update positions and velocity attributes of the objects using a bank of Kalman filters. FIG. 7 schematically depicts the object tracker module 119 including an exemplary bank of Kalman filters 206 configured to estimate position and velocity of a group of objects, in accordance with the present disclosure. Different filters are used for objects associated with different dynamic properties, such as e.g., objects coasting with constant velocity, objects with high longitudinal maneuver, objects with high lateral maneuver, and stationary objects. A Markov decision process (MDP) model 208 is used to select the Kalman filter having a greatest weighted value used for correspondence to accurate positions and velocity estimation for the object. Selecting a Kalman filter using the Markov decision process reduces tracking latency enabling greater collision preparation system functionality. The selected Kalman filter is used by the update object module 210 to update the object data including position and velocity.

An exemplary Markov decision process is herein described with reference to FIG. 7 and the object tracker module 119. The Markov decision process 208 is used to select a Kalman filter from the bank of Kalman filters 206 to update a position and velocity of an object. At a current time-step $t_k$, an object state $x_{t_k}$ with respect to a feature descriptor $I_{t_k}$, position and velocity of the object $P_{t_k}$, and classification label $L_{t_k}$, is determined using a selected i-th Kalman filter of any number of n bank of Kalman filters 206. The selected i-th Kalman filter exhibited a greatest probability of all the i-th Kalman filters to accurately determine the object state $x_{t_k}$. A Markov transition matrix, T, can be used to describe a probability that another Kalman filter will more accurately determine the object state $x_{t_k}$ at a future time-step $t_{k+1}$. Therefore, $T_{ij}$ represents a probability that the object state $x_{t_k}$ will change from an i-th Kalman filter to a j-th Kalman filter at time-step $t_{k+1}$.

The probabilities are predetermined through a data mining process using traffic data collected on public road, or simply through heuristic rules. Giving substantial long sequence logged vehicle data of multiple vehicles, we label for each vehicle $x_{t_k}$ at time $t_k$ to a particular model based upon ground truth data (collected through other measurement method, e.g., GPS data). Then the transition probability $T_{ij}$ can be determined by the following relationship:

$$T_{ij} = \frac{Pr(x_{t_k} \in i, x_{t_{k+1}} \in j)}{Pr(x_{t_{k+1}} \in j)} \quad [6]$$

where $Pr(x_{t_{k+1}} \in j)$ denotes the number occurrence of vehicle state belonging to model j at time-step $t_{k+1}$, and $Pr(x_{t_k} \in i, x_{t_{k+1}} \in j)$ denotes the number of occurrence of vehicle state belonging to model i and model j at time-steps $t_k$ and $t_{k+1}$, respectively.

An exemplary Markov decision process is herein described with reference to FIG. 7 and the object tracker module 119. The Markov decision process 208 is used to select a Kalman filter from the bank of Kalman filters 206 to update a position and velocity of an object. At a current time-step $t_k$, an object state $x_{t_k}$ with respect to a feature descriptor $I_{t_k}$, position and velocity of the object $P_{t_k}$, and classification label $L_{t_k}$, is determined using a selected i-th Kalman filter of any number of n bank of Kalman filters 206. The selected i-th Kalman filter exhibited a greatest probability of all the i-th Kalman filters to accurately determine the object state $x_{t_k}$.

Each Kalman filter is configured to update an object state $x_{t_k}$ at a current time-step k with respect to a feature descriptor $I_{t_k}$, position and velocity of the object $P_{t_k}$, and classification label $L_{t_k}$ based upon output of the data association module 118 and vehicle kinematic data from including vehicle speed and yaw rate from vehicle sensors 204. Additionally, each Kalman filter is configured to update a position measurement $z_{t_k}$ based upon measurements from the range sensing devices 14 and 16 and the camera 11. Each i-th Kalman filter of the n independent bank Kalman filters 206 can be outlined as:

$$\hat{x}_{t_k}^- = A^i \hat{x}_{t_{k-1}} + B^i u_{t_k} + v^i \quad [7]$$

$$z_{t_k} = H^i \hat{x}_{t_k} + \omega^i \quad [8]$$

where $A^i$ and $B^i$ are system matrices of the i-th Kalman filter, $u_{t_k}$ represents vehicle operator input and vehicle kinematic data including, e.g., brake and accelerator pedal position, steering wheel angle, and vehicle yaw rate, at time-step $t_k$, $v^i$ denotes modeling error for the i-th model, distributed as a Gaussian p.d.f., i.e., $v^i = N(0, Q^i)$, wherein $Q^i$ is a covariance matrix, $H^i$ is the measurement matrix for an i-th Kalman filter, and $\omega^i$ denotes the measurement error for the i-th Kalman filter, distributed as a Gaussian p.d.f., i.e., $\omega^i = N(0, R^i)$, wherein $R^i$ is the covariance matrix of i-th Kalman filter's measurement error.

The Markov decision process 208 selects a Kalman filter to update the object state $x_{t_k}$ and position measurement $z_{t_k}$ that is associated with a greatest weight $w^i$ of an i-th Kalman filter when compared with weights of all the Kalman filters. The weight $w^i$ describes a probability that a particular Kalman filter i will accurately determine the object state x. In operation, the Markov decision process 208 initiates each Kalman filter for the bank of Kalman filters 206 at mixed variables including weight $w_0^i$, mean $\hat{x}_0^i$, and covariance $P_0^i$. The Kalman filters are updated after receiving new measurement at time k, using previous estimates determined at a prior time-step $t_{k-1}$ including weight $w_{t_{k-1}}^i$, mean $\hat{x}_{t_{k-1}}^i$ and a covariance matrix $P_{t_{k-1}}^i$ for the i-th Kalman filter.

Mixed variables are iteratively determined using a transition probability matrix T determined as described herein above and selected based upon the Kalman filters being compared. The mixed variables are input into the bank of Kalman filters 206. A mixed weighted value describing time-step k can be determined for each Kalman filter i using the following relationship:

$$\overline{w}_{t_k}^i = \sum_{j=1}^n T_{ij} w_{t_{k-1}}^j \quad [9]$$

wherein $T_{ij}$ represent the probability of an object switching from a particular predicted classification i e.g., a stationary object classification, to another particular classification j e.g., coasting with constant velocity.

A mixed mean value can be determined for each Kalman filter using the following relationship.

$$\overline{x}_{t_{k-1}}^i = \sum_{j=1}^n T_{ij} w_{t_k}^j \hat{x}_{t_{k-1}}^j / \overline{w}_{t_k}^i \quad [10]$$

A mixed covariance value is iteratively determined for each Kalman filter using feedback including an estimated model-conditioned state and error covariance provided using relationships [19] and [20] described herein below. The mixed covariance value may be determined using the following relationship.

$$\overline{P}_{t_{k-1}}^i = \sum_{j=1}^n T_{ij} \overline{w}_{t_k}^j (P_{t_k}^j + (\hat{x}_{t_{k-1}}^i - \overline{x}_{t_{k-1}}^i)(\hat{x}_{t_{k-1}}^j - \overline{x}_{t_{k-1}}^i)^T / \overline{w}_{t_k}^i \quad [11]$$

After determining the mixed variables, the bank of Kalman filters determines the following relationships:

$$(\overline{x}_{t_k}^i)^- = A^i \overline{x}_{t_{k-1}}^i + B^i u_{t_k} \quad [12]$$

$$(P_{t_k}^i)^- = A^i \overline{P}_{t_{k-1}}^i (A^i)^T + Q^i \quad [13]$$

$$K_{t_k}^i = (P_{t_k}^i)^- (H^i)^T (H^i (P_{t_k}^i)^- (H^i)^T R^i)^{-1} \quad [14]$$

$$\hat{x}_{t_k}^i = (\hat{x}_{t_k}^j)^- + K_{t_k}^i (z_{t_k} - H^i (\hat{x}_{t_k}^i)^-) \quad [15]$$

$$P_{t_k}^i = (I - K_{t_k}^i H^i)(P_{t_k}^i)^- 1 \quad [16]$$

where $A^i$ and $B^i$ are system matrices of the i-th Kalman filter; $u_{t_k}$ represents vehicle operator input and vehicle kinematic data including, e.g., brake and accelerator pedal position, steering wheel angle, and vehicle yaw rate, at time index $t_k$; $Q^i$ denotes a covariance matrix representing model prediction error for the i-th Kalman filter; $H^i$ is the measurement matrix for the i-th Kalman filter; I represents an identity matrix; $K_{t_k}^i$ represents a Kalman gain for the i-th Kalman filter at time-step $t_k$; $\hat{x}t_k^i$ and $P_{t_k}^i$ denote the estimated mean and corresponding covariance matrix for the object at time-step $t_k$; and $R^i$ denotes a covariance matrix representing measurement error for the i-th Kalman filter.

A likelihood analysis is used to determine a likelihood that an i-th Kalman filter matches a current measurement observations. The likelihood analysis is executed using the following relationship:

$$L^i = \gamma^i e^{-\frac{1}{2}\left(z_{t_k} - H^i(\hat{\bar{x}}_{t_k}^i)^-\right)^T (c^i)^{-1} \left(z_{t_k} - H^i(\hat{\bar{x}}_{t_k}^i)^-\right)} \quad [17]$$

where $\gamma^i$ is a normalization coefficient used to integrate the p.d.f. to 1, $\hat{x}_{t_k}^i$ and $P_{t_k}^i$ denote the estimated mean and corresponding covariance matrix determined using relationships [12] and [13] herein above, and $C^i = H^i(P_{t_k}^i)^-(H^i)^T + R^i$.

After executing the likelihood analysis, weighted value is updated for the predicted classification according to the following relationship.

$$w_{t_k}^j = \frac{L^i \bar{w}_{t_k}^j}{\sum_{j=1}^n L^i \bar{w}_{t_k}^j} \quad [18]$$

where $\bar{w}_{t_k}^i$ and $L^i$ are computed in relationships [9] and [17], respectively.

After updating the weighted value, the estimated model-conditioned state and error covariance are determined using the following relationships:

$$\bar{x}_{t_k} = \Sigma_{i=1}^n w_{t_k}^i \hat{x}_{t_k}^i \quad [19]$$

$$\bar{P}_{t_k} = \Sigma_{i=1}^n w_{t_k}^i (P_{t_k}^i + \epsilon_i \epsilon_n^T) \quad [20]$$

where $\epsilon_i = \bar{x}_{t_k} - \hat{x}_{t_k}^i$.

Relationships [19] and [20] are the estimation output of an objects position and velocity out of the object tracker module 119. The feature descriptor and classification label associated with the objects remain unchanged from the data association module 118. The outputs are inputs to an object track database 113 configured to store object information including object track files and corresponding image areas and classification labels. The object information is stored for iterative comparison to new data and for prediction of relative motion to the vehicle suggesting a likely or imminent collision event. Additionally, a region or regions of interest, reflecting previously selected image areas, can be forwarded to the motion analysis and salient region detection module 112 performing image area identification, in order to provide continuity in the analysis of iterative vision data. In this way, range data or range track information is overlaid onto the image plane to improve estimation.

After the data fusion module 110 creates track estimates for objects in proximity to the vehicle 10 the object tracks are then input to the collision threat assessment module 120, wherein each track is assessed for likelihood for collision. Each object track includes a mixture of Gaussian distribution as $x \sim \Sigma_{i=1}^n w^i \mathcal{N}(\hat{x}^i, P^i)$, where $\hat{x}^i$ and $P^i$ are described herein in Relationships [15] and [16], respectively, with the time index subscript $t_k$ being ignored. This distribution can be randomly sampled to obtain a set of particles representing a probability distribution of the object.

For example, for an n-th object, a corresponding particle set $s = \{x_n^{(\zeta)}\zeta = 1, \ldots, M\}$ where M denotes the number of particles represents the probability distribution. The $\zeta$-th particle $x_n^{(\zeta)} = (x_n^{(\zeta)}, y_n^{(\zeta)}, vx_n^{(\zeta)}, vy_n^{(\zeta)})$ where $x_n^{(\zeta)}$ is the n-th object's longitudinal displacement, $y_n^{(\zeta)}$ is the lateral displacement, $vx_n^{(\zeta)}$ and $vy_n^{(\zeta)}$ is the object's longitudinal and lateral velocities, respectively. If the object $x_n^{(\zeta)}$ is in the collision path, and time-to-collision (TTC) $TTC^{(\zeta)} = -x_n^{(\zeta)}/vx_n^{(\zeta)}$ is less than a threshold (e.g., 2 seconds), the particle $x_n^{(\zeta)}$ is designated as a threat. The collision threat assessment module 120 determines the likelihood for collision based upon a percentage of a number of threats per total particles associated with an object. The likelihood for collision is outputted to the collision counter-measures module 150.

The likelihood for collision of an identified object is analyzed by a collision counter-measures module 150. This likelihood for collision can be evaluated, for example, against threshold likelihood for collision, and if a collision is determined to be likely, collision counter-measures can be initiated. For example, if the likelihood for collision is larger than a threshold (e.g., 90%), then the object poses an immediate threat to the host vehicle and appropriate collision counter-measurements are executed. Collision counter-measurements can include seat belt tightening, throttle idling, automatic braking, air bag preparation, adjustment to head restraints, horn and headlight activation, adjustment to pedals or the steering column, adjustments based upon an estimated relative speed of impact, adjustments to suspension control, and adjustments to stability control systems. Reaction to likely collision events can be scaled based upon increased likelihood. For example, gentle automatic braking can be used in the event of a low threshold likelihood being determined, and more drastic measures can be taken in response to a high threshold likelihood being determined.

Additionally, it will be noted that improved accuracy of judging likelihood can be achieved through iterative training of the alert models. For example, if an alert is issued, a review option can be given to the driver, through a voice prompt, and on-screen inquiry, or any other input method, requesting that the driver confirm whether the imminent collision alert was appropriate. A number of methods are known in the art to adapt to correct alerts, false alerts, or missed alerts. For example, machine learning algorithms are known in the art and can be used to adaptively utilize programming, assigning weights and emphasis to alternative calculations depending upon the nature of feedback. Additionally, fuzzy logic can be utilized to condition inputs to a system according to scalable factors based upon feedback. In this way, accuracy of the system can be improved over time and based upon the particular driving habits of an operator.

Figure 8:
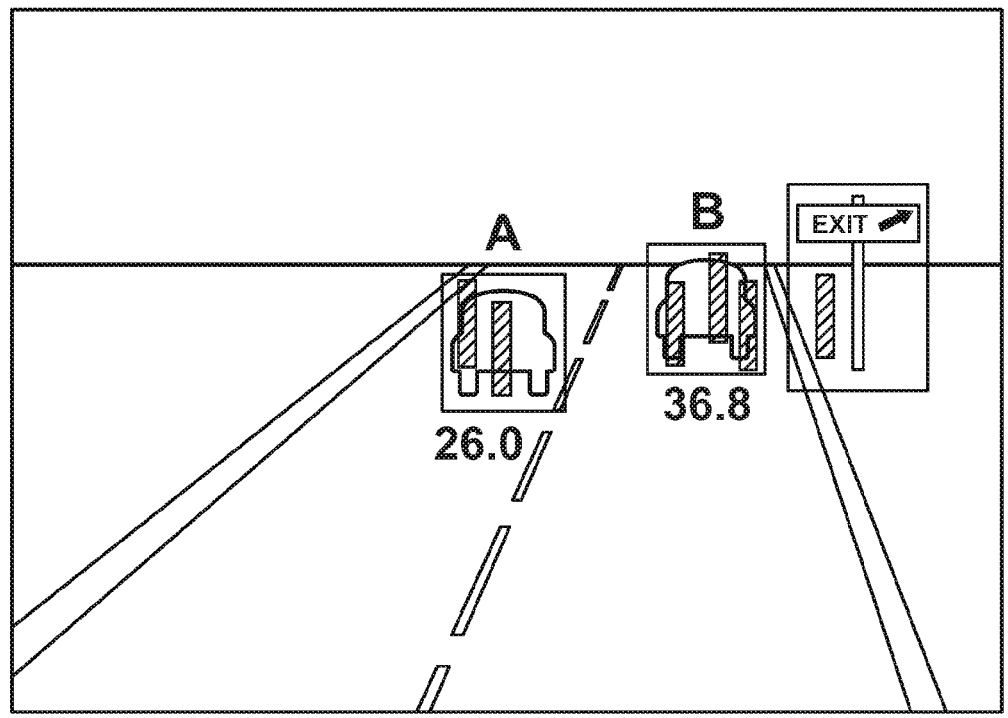
FIG. 8 illustrates exemplary range data overlaid onto a corresponding image plane, in accordance with the present disclosure.

FIG. 8 illustrates exemplary range data overlaid onto a corresponding image plane, in accordance with the present disclosure. The shaded bars are the radar tracks overlaid in the image of a forward-looking camera. As described herein above, motion analysis and salient region detection module 112 extracts the image areas enclosing the range sensor tracks. The feature extraction module 114 computes the feature descriptor of the image areas. The classification module 116 takes the extracted features as input and feeds to a classifier to determine whether an image area encloses an object. The classification determines the label of each image area. For example, in FIG. 8, the boxes A and B are identified as vehicles while the unlabelled box is identified as road-side object. The prediction process module 117 utilizes an object's historical information (i.e., position, image patch, and label of previous cycle) and predicts the current values. The data association module 118 links the current measurements with the predicted objects, or determines the source of a measurement (i.e., position, image patch, and label) is from a specific object. The object tracker module 119 generates updated positions for the objects for storage in the object track database 113.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for controlling a vehicle operating during a dynamic vehicle event, the method comprising:
monitoring a first input image;
determining within the first input image a first tracked object;
monitoring the first tracked object within the first input image in a first tracking cycle;
determining a position within the first input image of the first tracked object;
defining features within the first input image proximate to the first tracked object;
determining a first label describing a likely classification of the first tracked object;
monitoring a second input image;
determining within the second input image a second tracked object;
monitoring the second tracked object within the second input image in a second tracking cycle;
determining a position within the second input image of the second tracked object;
defining features within the second input image proximate to the second tracked object;
determining a second label describing a likely classification of the second tracked object;
determining a dissimilarity measure comparing the positions of each of the first and second tracked objects, the features proximate to each of the first and second tracked objects, and the first and second labels, the dissimilarity measure estimating whether the first tracked object and the second tracked object represent a single tracked object proximate to the vehicle;
associating the first tracked object and the second tracked object based upon the dissimilarity measure; and
utilizing the associated objects in a collision preparation system to control operation of the vehicle.

2. The method of claim 1, wherein the likely classifications include a quickly moving object, a slowly moving object, and a stationary object.

3. The method of claim 1, further comprising:
monitoring range sensor data corresponding to each of the input images; and
wherein determining within the input images the tracked objects is based upon the range sensor data corresponding to each of the input images.

4. The method of claim 1, wherein the second label is based upon the first label.

5. The method of claim 1, wherein determining within the input images the tracked objects comprises identifying salient image areas and areas associated with motion in each of the images.

6. The method of claim 5, wherein identifying salient image areas and areas associated with motion in each of the images comprises:
determining an edge map;
determining a corner map;
determining a Lucan-Kanade optical flow map;
determining an area of the input image indicating ground; and
identifying the salient image areas and the areas associated with motion based upon the edge map, the corner map, the Lucan-Kanade optical flow map, and the area of the input image indicating ground.

7. The method of claim 6, wherein identifying salient image areas and areas associated with motion further comprises projecting object information from a previous input image upon the input image; and
wherein identifying the salient image areas and the areas associated with motion is further based upon the projecting object information from the previous input image.

8. The method of claim 1, wherein the first object is selected a priori to compare to the second object.

9. The method of claim 1, further comprising:
analyzing the associated tracked objects with a bank of Kalman filters; and
wherein utilizing the associated tracked objects in the collision preparation system comprises utilizing the analyzed associated tracked objects.

10. The method of claim 9, wherein analyzing the associated objects with a bank of Kalman filters comprises:
monitoring a speed and a yaw rate of the vehicle;
applying the bank of Kalman filters to the associated objects and the speed and yaw rate of the vehicle; and
utilizing a Markov decision process upon the output from the bank of Kalman filters to generate the analyzed associated objects.

* * * * *